United States Patent
Wolfsgruber (10) Patent No.: US 10,028,572 B2
(45) Date of Patent: Jul. 24, 2018

(54) ONE-PIECE, MULTI-COMPONENT INJECTION-MOLDED BRUSH AND METHOD FOR PRODUCING IT

(71) Applicant: GEKA GmbH, Bechhofen (DE)

(72) Inventor: Dieter Wolfsgruber, Burgoberbach (DE)

(73) Assignee: GEKA GmbH, Bechhofen (DE)

( * ) Notice: Subject to any disclaimer, the term of this patent is extended or adjusted under 35 U.S.C. 154(b) by 662 days.

(21) Appl. No.: 14/411,502

(22) PCT Filed: Jun. 18, 2013

(86) PCT No.: PCT/EP2013/062652
§ 371 (c)(1),
(2) Date: Dec. 27, 2014

(87) PCT Pub. No.: WO2014/001156
PCT Pub. Date: Jan. 3, 2014

(65) Prior Publication Data
US 2015/0164207 A1     Jun. 18, 2015

(30) Foreign Application Priority Data
Jun. 28, 2012    (DE) .................. 10 2012 105 714

(51) Int. Cl.
| A46B 1/00 | (2006.01) |
| A46B 3/00 | (2006.01) |
| B29C 45/14 | (2006.01) |
| B29C 45/26 | (2006.01) |
| B29C 45/16 | (2006.01) |
| B29L 31/42 | (2006.01) |

(52) U.S. Cl.
CPC ........ *A46B 3/005* (2013.01); *B29C 45/14344* (2013.01); *B29C 45/164* (2013.01); *B29C 45/261* (2013.01); *B29C 45/2626* (2013.01); *B29C 2045/1681* (2013.01); *B29L 2031/42* (2013.01)

(58) Field of Classification Search
USPC .................................. 15/179, 181, 183, 187
See application file for complete search history.

(56) References Cited

U.S. PATENT DOCUMENTS

| 3,755,847 A * | 9/1973 | Liebscher ................ A46B 7/04 101/415.1 |
| 2003/0163884 A1 | 9/2003 | Weihrauch |
| 2005/0172439 A1 | 8/2005 | Weihrauch |

(Continued)

FOREIGN PATENT DOCUMENTS

| DE | 3712962 A1 | 11/1988 |
| DE | 19743556 A1 | 4/1999 |
| DE | 102007055273 A1 | 5/2009 |

(Continued)

*Primary Examiner* — Joseph J Hail
*Assistant Examiner* — Shantese McDonald (57) ABSTRACT

A brush with a bristle support tube and a set of injection-molded bristles, which are affixed to the bristle support tube, extend through the outer wall of the bristle support tube, and are of one piece with a plastic element that fills at least a part of the inside of the bristle support tube; the interior of the bristle support tube has at least one dividing wall that divides the interior of the bristle support tube into compartments that are separate from one another.

10 Claims, 4 Drawing Sheets

(56) References Cited

U.S. PATENT DOCUMENTS

2008/0083421 A1* 4/2008 Malvar ................ A45D 40/267
                                                        132/218
2008/0098547 A1* 5/2008 McKey ................ A01K 13/002
                                                       15/104.94

FOREIGN PATENT DOCUMENTS

| DE | 202011050794 U1 | 9/2011 |
| DE | 202011002793 U1 | 6/2012 |
| EP | 2030524 A1 | 3/2009 |

* cited by examiner

ONE-PIECE, MULTI-COMPONENT INJECTION-MOLDED BRUSH AND METHOD FOR PRODUCING IT

FIELD OF THE INVENTION

The invention relates to a brush with a bristle support tube and a set of injection-molded bristles, which are affixed to the bristle support tube, extend through the outer wall of the bristle support tube, and are of one piece with a plastic element that fills at least a part of the inside of the bristle support tube. A brush of this kind is preferably used as a cosmetic applicator and ideally as a mascara applicator, even in the context of the invention, which especially relates to this.

BACKGROUND OF THE INVENTION

For a long time, cosmetic applicators in the form of brushes have been classically produced exclusively by inserting natural or synthetic fibers between two wires that were initially straight. Then these wires were twisted and secured the fibers that had been inserted between them in a particular configuration. Brushes of this kind are generally referred to as wire core brushes.

Wire core brushes have many advantages, but they have a critical disadvantage, namely that the spacing of the individual bristles of the bristle set from one another can only be varied within very narrow ranges. It is practically impossible to produce an applicator that has a bristle set that is truly uniform around and along the longitudinal direction. Instead, in wire core brushes, the bristle set is always the densest along a helix that follows the twisting of the wires, while being less dense in other regions.

Since it has become possible to produce ever more delicate injection molds, for approximately the last ten years, there has been an increase in the production of injection-molded brushes, even among those that are then used as mascara applicators. These are one-piece brushes in which the bristle support and the bristles protruding from it are produced from one and the same material, usually by means of injection molding.

In practice, there is in many cases a need to manufacture the bristle support on the one hand and the bristles that are fastened to it on the other out of different materials, which each take into account the individual requirements. It is thus useful, for example, to produce the bristle support out of a harder material in order to provide it with the necessary rigidity, while on the other hand, it is useful to produce the bristles out of a material that is softer than the material of the bristle support in order to thus provide them with the desired flexibility and above all, to prevent the bristles from giving a "prickly" feeling, haptically speaking.

In order to be able to fulfill this requirement, the Moltrusion® technique was developed, which is described by European patent EP 1 507 640 B1. The so-called Moltrusion technique is based on the concept of embodying the bristle support as a thin-walled tube, which is made of the material that should ideally be used for this purpose. This tube is inserted into the injection mold used to produce the bristles and is injection-filled from the inside out.

Because the plastic melt that subsequently forms the bristles is first injected into the inside of the bristle support tube and then forms the bristles due to the piercing of the outer wall of the bristle support tube, it is possible to produce bristles that have outstanding strength properties since this method provides the plastic molecules with a strength-enhancing orientation.

With the aid of the Moltrusion technique, however, it is only possible to produce one type of bristles. Up to this point, it has not been possible to produce different bristles on the same brush by respectively using the Moltrusion technique.

The object of the invention is to disclose a brush that has a bristle field composed of different injection-molded bristles, which can be efficiently produced and each have improved strength properties compared to conventionally injection-molded bristles.

Another object of the invention is to disclose a corresponding method.

SUMMARY OF THE INVENTION

This object is attained by a brush with a bristle support tube and a set of injection-molded bristles, which are affixed to the bristle support tube, extend through the outer wall of the bristle support tube, and are of one piece with a plastic element that fills at least a part of the inside of the bristle support tube. The brush according to the invention features the fact that the interior of the bristle support tube has at least one dividing wall, which divides the inside of the bristle support tube into compartments that are separate from one another.

Such a compartmentalization of the bristle support tube makes it possible to simultaneously inject the inside of the bristle support tube with a plurality of plastic compounds that do not initially mix with one another. Instead, each of the plastic melts remains in the compartment assigned to it for a sufficient amount of time to pierce the outer wall of the bristle support tube and thus travel into the bristle-forming cavities that are provided for it. It is thus possible to produce brushes, which have a bustle field that is composed of different bristles, all of which are produced with the aid of the Moltrusion technique and therefore have optimized properties. Preferably, the interior of the bristle support tube has a plurality of dividing walls that divide the interior of the bristle support tube into more than two compartments that are separate from one another. This makes it possible to produce brushes with a bristle set, which is composed of more than two types of bristles that are different, but are produced by means of the Moltrusion technique.

Preferably, the thickness of the at least one dividing wall is greater than the thickness of the outer wall of the bristle support tube. This results in the filet that the at least one dividing wall keeps the different plastic compounds separate for long enough, namely preferably for long enough that most the respective bristle-forming cavities are properly filled with the plastic compound assigned to them and therefore a mixing of the different plastic compounds that takes place after a possible collapse of the dividing wall essentially only occurs inside the bristle support tube.

Ideally, at least two of the compartments that are delimited by at least one dividing wall are injection-filled not only with differently colored plastic material, but also with plastic materials that have different application properties when these plastic materials each form bristles. In this way, it is possible, for example, to produce brushes with a bristle field that is uniform, but has harder bristles on the one side and softer bristles on the other side. An embodiment of this kind is extremely advantageous, for example, for a mascara applicator. It is then possible, for example, to use the side of the bristle field that is composed of the softer and more flexible bristles to apply the mascara compound and then the applicator can be turned by a certain angle in order to use the part of the bristle field that is composed of the harder and less flexible bristles to separate or "curl" the lashes.

Preferably, the end of the bristle support tube is adjoined by a coupling section with the aid of which the bristle support tube can be fastened to a stem or handle. Ideally, the coupling section is an integral component of a plastic element that also fills at least one of the plurality of compartments. Such an embodiment makes it possible to produce the coupling section out of the same plastic compound as at least part of the bristles. In this way, the coupling section can be integrally formed at the same time as the bristles are being injection molded.

It can be advantageous to embody the bristle support tube as a section of an endlessly extruded profile, which permits a very efficient production of the bristle support.

In terms of the method, the brush according to the invention is produced in that first a bristle support tube is produced from a first plastic. This bristle support tube has at least two different compartments. In a second production step, which follows the production of the bristle support tube, at least two compartments that are separated by a dividing wall that is provided on the inside of the bristle support tube are injection-filled with plastic. In this case, the injection pressure in each is set high enough that the plastic used to injection-fill each compartment pierces the outer wall of the bristle support tube locally, wherever the outside is adjoined by an initially still empty bristle-forming cavity, which is then filled by the jet of plastic that passes through the breach in the outer wall of the bristle support tube from the inside.

Ideally, different plastic compounds are injected simultaneously and at the same pressure from a first end of the bristle support tube into one first and at least one second compartment that are separated from each other in the longitudinal direction by a dividing wall.

The injection at essentially the same pressure ensures that the dividing wall or plurality of dividing walls fulfills its function for long enough. In other words, the dividing wall or dividing walls is/are either not pierced by the plastic compounds, which they keep separate from each other, until the end of the injection-molding procedure or are only pierced at a time when the bristle-forming cavities are predominantly filled as intended with the plastic compound assigned to them, so that the plastic compounds that are initially kept separate from each other mix with each other essentially only on the interior of the bristle support tube.

Other advantages, embodiment options, and effects of the invention will become apparent from the exemplary embodiments, which will be described with the aid of the figures.

DETAILED DESCRIPTION OF THE PREFERRED EMBODIMENTS

The invention generally relates to brushes with injection-molded bristles. A special application field of the invention is the production of applicators equipped with bristles for the application of cosmetics. In particular, the invention is used for producing mascara applicators with injection-molded bristles. In the context of the invention, bristles are preferably understood to mean those with a rod-like structure whose length is at least 5×, preferably at least 10× greater than its maximum thickness perpendicular to its longitudinal axis.

Figure 1:
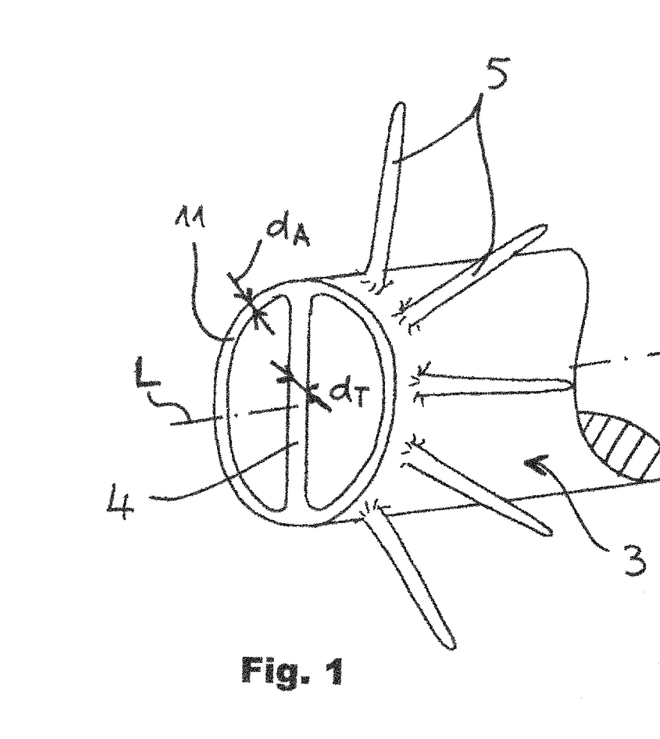
FIG. 1: shows a first exemplary embodiment of the invention with a bristle support tube, which is divided into two compartments by a dividing wall.

FIG. 1 shows a detail of a first exemplary embodiment of the invention.

Figure 4:
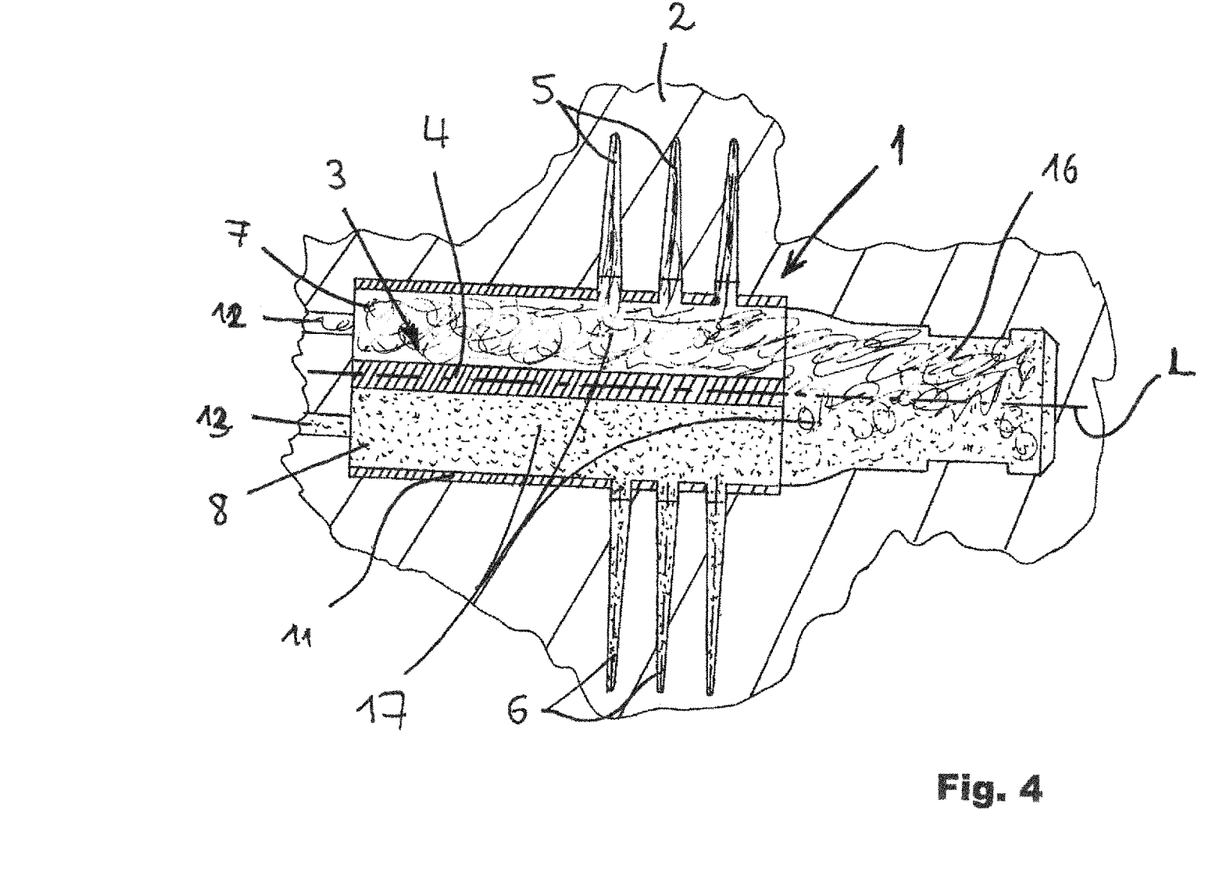
FIG. 4: shows a longitudinal section through a bristle support tube according to FIG. 1, which has been inserted into a corresponding injection mold, after the injection of the two different plastic compounds is complete.

The drawing shows the front region of an applicator 1 that is equipped with bristles and is shown in its entirety, for example, by FIG. 4.

Figure 5:
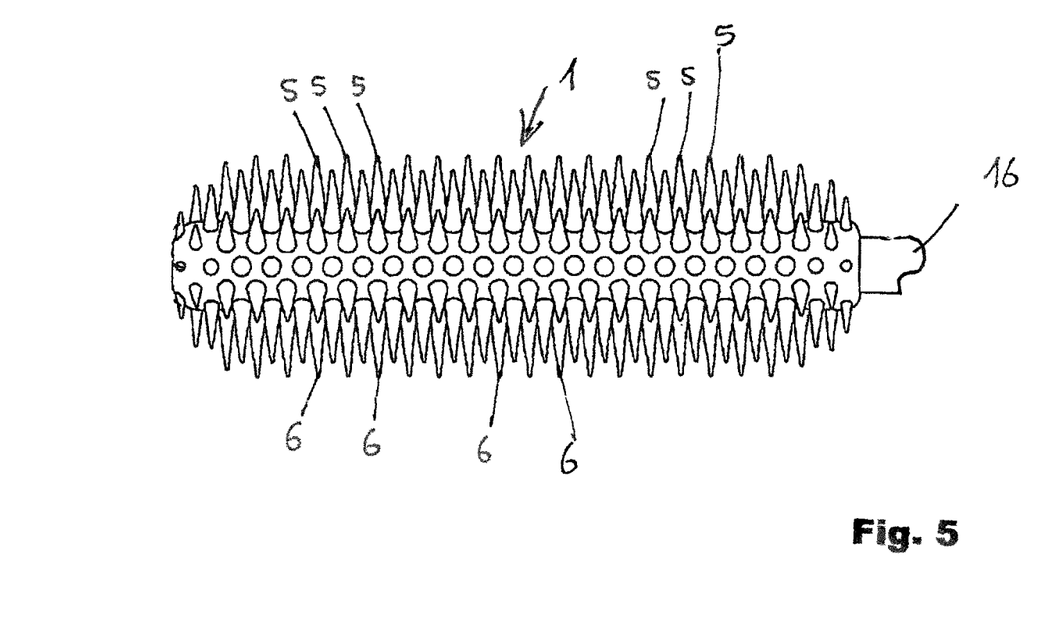
FIG. 5: shows a finished brush according to the invention.

Such an applicator must be imagined as having bristles along the entire bristle support tube 3, which are usually fastened to the bristle support 3 in an organized pattern and extend in a radially outward direction from it. The finished applicator completely equipped with bristles then looks like the one shown in FIG. 5, for example. Typically, the bristles form bristle rings composed of bristles that are arranged in the circumference direction so that they are aligned with one another along a circular line. A bristle ring is preferably composed of 8 to 22 bristles. There are preferably 12 to 36 bristle rings arranged one after the other in the longitudinal direction L. Adjacent bristle rings can be slightly offset relative to each other, as shown in FIG. 5. For example, a preferred type of embodiment is to position bristle rings situated one after the other in the direction of the longitudinal axis L so that they are offset from each other in such a way that a bristle of the next bristle ring is always situated exactly in the middle, in a gap between bristles that are immediately adjacent to each other in the circumference direction.

The bristle support tube 3 used according to the invention is usually composed of a comparatively hard plastic, i.e. a plastic that is less elastic than the plastic or plastics used for the bristles.

Figure 2:
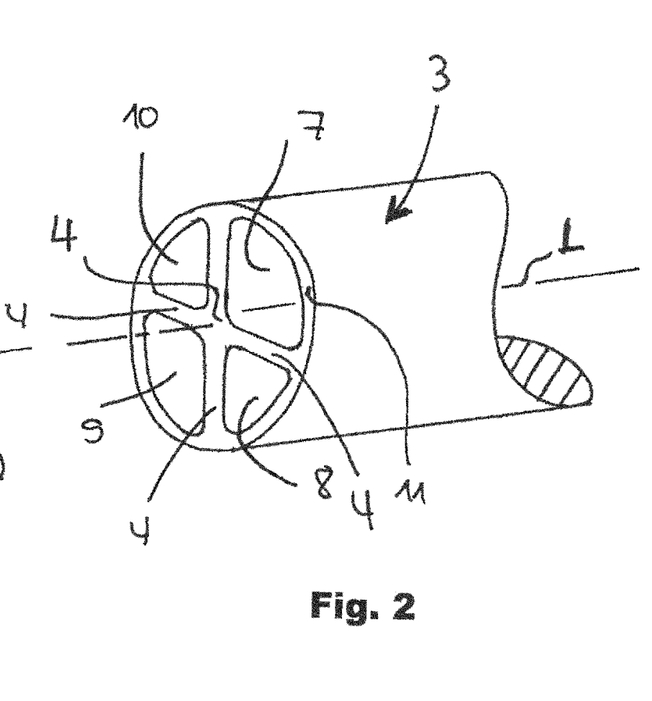
FIG. 2: shows an embodiment in which the bristle support tube is divided into a total of four compartments by a plurality of dividing walls.

The bristle support tube 3 is ideally round, i.e. has a circular cylindrical cross-section. In the simplest approach, such a round bristle support tube can be inserted into an injection mold so that under the influence of the pressure with which the plastic compounds are injected into its interior, it rests snugly against the inner circumference of the injection mold receiving it. This ensures that in the vicinity of the breaches that the plastic compounds force through the wall of the bristle support tube, practically no plastic compound penetrates into the region between the outer circumference of the bristle support tube and the inner circumference of the injection mold. Alternatively, however, the bristle support tube 3 can also have a polygonal, for example hexagonal, octagonal, decagonal, or elliptical cross-section. The bristle support tubes according to the invention constitute a longitudinal axis L, as shown in FIGS. 1 and 2.

According, to the invention, the special feature of the bristle support tube 3 is that it has a dividing wall 4, which divides the interior encompassed by the outer wall of the bristle support tube 3 into at least one first compartment 7 and at least one second compartment 8. Typically, the outer wall 11 of the bristle support tube 3 is thinner than the dividing, wall 4, i.e. the thickness $d_A$ of the outer wall 11 is preferably 0.3 mm to 0.8 mm. The thickness $d_T$ of the dividing wall 4 is preferably at least twice this amount.

Figure 3:
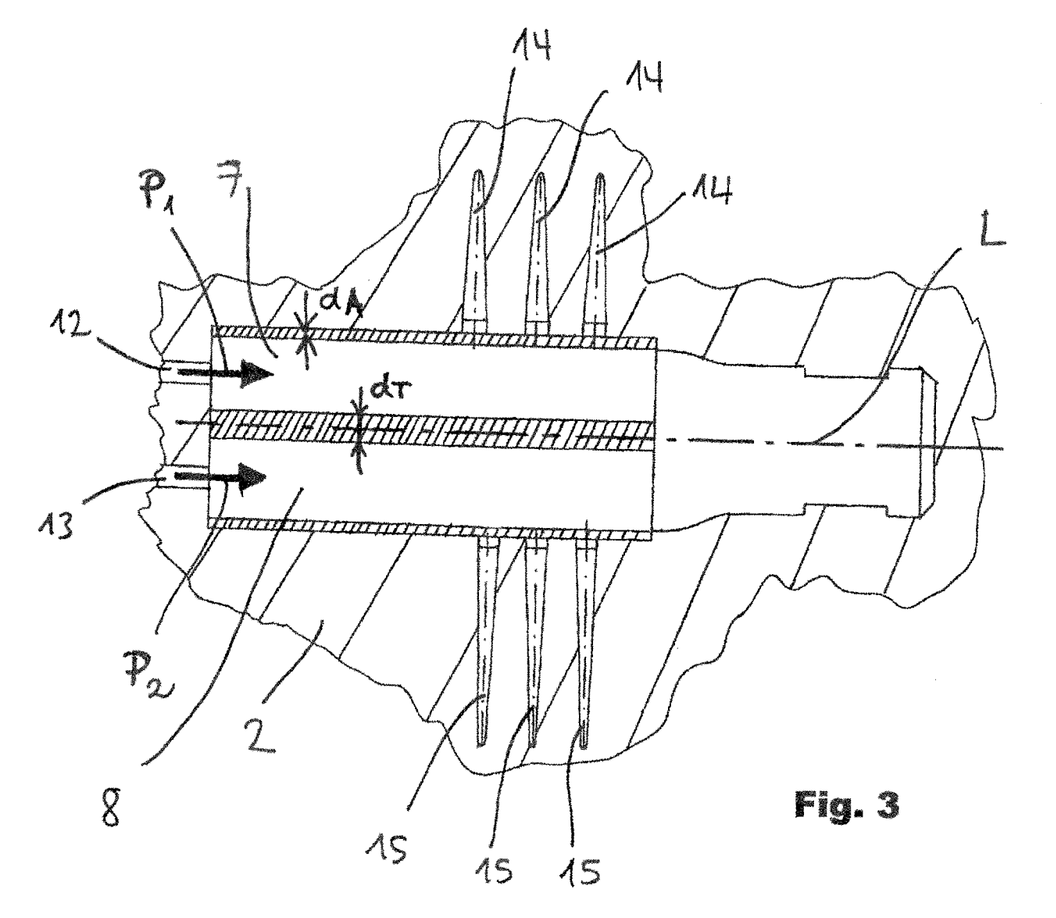
FIG. 3: shows a longitudinal section through a bristle support tube according to FIG. 1, which has been inserted into a corresponding injection mold, at the beginning of the injection of the two different plastic compounds.

The reason why the bristle support tube 3 is divided by the dividing wall 4 into at least two compartments 7 and 8 becomes clear on closer examination of FIGS. 3 and 4, which should be done now.

FIG. 3 shows a detail of an injection mold 2 in the region of its cavity that forms the brush 1 according to the invention. This injection mold 2 is typically composed of multiple parts. In order to be able to remove the brush from the mold once its injection-molding is complete, without its bristles tearing, the injection mold is preferably segmented in the same way as a cake that has been cut into individual pieces. The individual segments of the injection mold embodied similarly to slices of cake can be moved apart from one another in the radial direction.

FIG. 3 shows the injection mold at the beginning of an injection procedure, i.e. at the moment in which plastic compound is first injected into the mold cavity; at this point, no appreciable amount of plastic compound has traveled into the mold cavity. It is clear that before the closing of the mold, a bristle support tube 3 has been inserted into the region that, when the mold is closed, forms the mold cavity that molds the bristle support, and that now, with the mold closed, this bristle support tube is completely enclosed by the mold cavity. The bristle support tube 3 rests in the mold cavity in such a way that it seals the bristle-forming cavities 14, 15 branching off from the central mold cavity so that plastic compound cannot easily penetrate into these bristle-forming molding cavities 14, 15 from the inside of the bristle support tube 3. As is clear, the bristle support tube 3 rests with both of its ends in a sealed fashion against an end surface of the mold cavity or against a shoulder of the mold cavity. This contributes to the fact that no plastic compound can travel past the bristle support tube 3 into the region of the bristle-forming cavities without piercing the wall of the bristle support tube.

It is also worth noting that the bristle-forming cavities 14, 15 in this exemplary embodiment are embodied differently; there are first bristle-forming cavities 14, which mold more compact bristles, and second bristle-forming cavities 15, which preferably mold slenderer, longer bristles. On the right in FIG. 3, the region of the mold cavity that accommodates the bristle support tube 3 is adjoined by another section of the cavity, which forms the subsequent coupling section 16 of the completed applicator, see FIG. 4.

FIG. 3 also clearly shows the injection conduit 12 and second injection conduit 13, which are only depicted in very simplified firm. Each of these two injection conduits is arranged relative to the bristle support tube 3 so that it communicates directly with only one compartment of the bristle support tube 3, namely with the first compartment 7 and the second compartment 8 in this exemplary embodiment. In other words, the plastic compound that is injected with the aid of the first injection conduit 12 cannot travel directly into the second compartment 8, i.e. without passing through the first compartment 7. The same logically applies to the second injection conduit 13 and the second compartment 8.

The arrows P1 and P2 symbolize the front of the incoming plastic compounds. The plastic compound symbolized by the arrow P1 preferably differs from the plastic compound symbolized by the arrow P2 in its color and/or its material properties. Typically, the two plastic compounds have different elasticities. As a rule, one plastic compound is more elastic than the other. Typically, one of the plastic compounds is comparatively hard (in the cooled state) and thus forms tines that differ from the rest of the bristles because they only flex slightly so that they can be used to comb and separate the lashes or other keratinous fibers.

All of the plastic compounds are injected into the respective compartments of the bristle support tube simultaneously and at as close to the same pressure as possible. In this way, they fill the two compartments 7 and 8 essentially simultaneously and then meet up with each other in the region of the cavity that subsequently forms the coupling section 16. Here, the two plastic compounds may mix with each other in a certain way, but this does not impair the function of the coupling section 16, namely its task of providing a form-fitting hold in a stem or a handle. With a correct choice of the injection pressure, injection speed, and injection quantity, however, no mixing of the two plastic compounds occurs in the region of the compartments 7 and 8. This is the crucial point that is essential to the invention—the two compartments fulfill their tasks provided according to the invention of separating the two plastic compounds in the region where this is important. The injection parameters to be selected (injection time, injection speed, injection pressure, injection quantity) depend on the individual case, but can also be determined by means of the testing that is customary in the field. At the latest as soon as all of the compartments and the region of the cavity that subsequently forms the coupling section 16 are filled, the so-called "Moltrusion®" occurs. This is understood to mean the process in which the pressure inside the bristle support tube 3 becomes so great that the plastic compound pierces the thin outer wall of the bristle support tube 3 from the inside, locally in precisely the regions in which there is an as yet unfilled cavity that is embodied to form a respective bristle on the outside of the bristle support tube 3.

In this way, the respective plastic compound shoots through the wall of the bristle support tube 3 into the bristle-forming cavities and hardens there. Thus after the hardening, the different plastic compounds constitute one or more plastic elements that fill(s) the interior of the bristle support tube and that is/are of one piece with the bristles.

The crucial point is that now, precisely in this region in which the bristles are formed, the dividing wall 4 of the bristle support tube 3 prevents the preferably different plastic compounds that are contained in the individual compartments from mixing with one another.

It is consequently possible for all of the bristle-forming cavities that are situated in the region of a compartment to be filled exclusively with the plastic that has been injected into this compartment, while all of the bristle-forming cavities that are situated directly in the region of another compartment are filled exclusively with the plastic compound that has been injected into this second compartment. It is thus possible to produce a brush with a bristle field that is preferably intrinsically completely closed in the circumference direction and is composed of different bristles. For example, a bristle field can be produced that is simultaneously composed of bristles of a first plastic and bristles of a second plastic. The user can thus turn the brush or applicator to select which pan of the bristle field she wishes to use, for example, to apply the mascara compound, and can choose the part of the bristle field that is composed of harder bristles or the part of the bristle field that is composed of softer bristles.

When selecting the injection pressure, care must be taken to avoid the occurrence of a destructive pressure difference between the different compartments of the bristle support tube, in any case during the phase in which the plastic compounds shoot into the bristle-forming cavities to which they are assigned.

This is important for the following reason: As soon as a significant pressure difference prevails between two compartments (for example 7 and 8), the hot plastic compound that is injected into the compartment at a high pressure can possibly destroy the dividing wall 4 prematurely. As a result, the plastic compound that is initially at a high pressure can, under unfavorable circumstances, travel into the bristle-forming cavities for which it is not provided.

For this reason, the wall thickness dT of the dividing wall is also selected to be correspondingly thicker than the wall thickness dA of the outer wall, which is supposed to be pierced.

In this connection, it is not absolutely required for the dividing wall to remain stable until the end of the injection molding procedure. It can be sufficient for the dividing wall to only collapse one the majority of the plastic compound that is intended for the bristle-forming cavities has already been shot into them so that the inevitable mixing of the plastic compounds after the collapse of the dividing wall essentially takes place only in the core of the bristle support, in other words inside the bristle support tube.

Naturally, it is possible to also form a bristle field out of more than only two different bristle types, for example out of three or four different bristle types, to be specific.

For this purpose, the bristle support tube 3 is divided into a plurality of compartments, for example three of them, or into four compartments as shown in FIG. 2. This can be produced quite simply by means of a plurality of dividing walls, for example four dividing walls, which extend away from one another in a star shape, as shown in FIG. 2. Here, too, the dividing walls preferably have a thicker wall thickness than the outer wall 11 of the bristle support tube 3. A welcome side effect of dividing walls 4 arranged in a star shape, as shown by way of example in FIG. 2, is the fact that the dividing walls stabilize one another. The four dividing walls of the bristle support tube shown in FIG. 2 form a first compartment 7, a second compartment 8, a third compartment 9, and a fourth compartment 10.

In this way, a maximum total of four different bristle types can be produced, for example three bristle types with different elasticities and a fourth bristle type with a significantly lower elasticity, which is suitable for combing or is inelastic enough to form comb tines.

As a rule, in each of the exemplary embodiments, the at least one dividing wall provided according to the invention, viewed in the longitudinal direction of the bristle support tube, extends through the entire interior of the bristle support tube. In this way, it is possible to achieve a particularly reliable separation of the plastic compounds that are injected in to the different compartments.

For the sake of completeness, it should be noted that the bristle support tube is preferably extruded in the form of an initially endless plastic part. Then, it is cut to length to form precisely dimensioned pieces, which can then in turn be inserted into the respective mold cavity. It is thus possible to also efficiently and inexpensively produce bristle support tubes that have several or many compartments.

Naturally, it is not a must to use such a bristle support tube that is open at both ends. Instead, it is also possible to use a bristle support tube that has been produced, for example, by means of injection molding and that already has a coupling section 6 formed onto it and is therefore only open at one of its ends.

It is very advantageous that the abrupt piercing of the wall of the bristle support tube from the inside gives the injection-molded bristles very advantageous properties since the molecular chains of the plastic compound that abruptly shoots into the bristle-forming cavity after the wall is pierced have a pronounced orientation in the longitudinal direction and in this way, form bristles that have particularly good application properties that are comparable to the application properties of spun brushes. The most important factors to be noted in this connection are the outstanding recovery effect (bend recovery) and the inherently powerful spring action.

The invention claimed is:

1. A brush comprising:
   a bristle support tube having at least one dividing wall formed of the same material as the bristle support tube, and the at least one dividing wall divides an interior of the bristle support tube encompassed by an outer wall into at least a first compartment and a second compartment, wherein the compartments are separate from one another;
   a first set of injection-molded bristles, which are affixed to the bristle support tube, and extend through the outer wall of the bristle support tube, and are formed of a first plastic element that fills at least a part of an interior of the first compartment of the bristle support tube; and
   a second set of injection-molded bristles, which are affixed to the bristle support tube, and extend through the outer wall of the bristle support tube, and are formed of a second plastic element different from the first plastic element, wherein the second plastic element fills at least a part of an interior of the second compartment of the bristle support tube.

2. The brush according to claim 1, wherein the interior of the bristle support tube has a plurality of the dividing walls that divide the interior of the bristle support tube into more than two compartments that are separate from one another.

3. The brush according to claim 1, wherein the at least one dividing wall, viewed in a longitudinal direction of the bristle support tube, extends through the entire interior of the bristle support tube.

4. The brush according to claim 1, wherein a thickness of the at least one dividing wall is greater than a thickness of the outer wall of the bristle support tube.

5. The brush according to claim 1, wherein at least a part of the bristles of the brush are injection-molded bristles whose molecular chains have a characteristic alignment that is produced when the melted plastic element that subsequently forms the bristles is injected under pressure into the interior of the bristle support tube and as a result, pierces the outer wall of the bristle support in order to travel into bristle-forming cavities of an injection mold.

6. The brush according to claim 1, wherein the bristle support tube is a tube that is open at both of its ends.

7. The brush according to claim 6, wherein one end of the bristle support tube is adjoined by a coupling section with the aid of which the bristle support tube can be fastened to a stem or handle; and the coupling section is an integral component of a plastic element that also fills at least one of the plurality of compartments.

8. The brush according to claim 1, wherein the bristle support tube is a section of an extruded profile.

9. A method for producing a brush, the method comprising:
   first, producing a bristle support tube from a first plastic;
   in a second production step, injection-filling at least two separate compartments that are formed by a dividing wall formed of the same material as the bristle support tube that is provided on the interior of the bristle support tube with a second and/or third plastic that is/are different than the first plastic; and setting the injection pressure in each compartment high enough that the plastic used to injection-fill each compartment pierces the outer wall of the bristle support tube locally, wherever the outside is adjoined by an initially still empty bristle-forming cavity, which is then filled by the jet of plastic that passes through a breach in the outer wall of the bristle support tube from the interior and forms a set of injection-molded bristles, which are affixed to the bristle support tube, and extend through an outer wall of the bristle support tube.

10. The method according to claim 9, comprising injecting different plastics simultaneously and at the same controlling pressure from a first end of the bristle support tube into one first and at least one second compartment that are separated from each other in a longitudinal direction by a dividing wall and these plastics partially emerge from the bristle support tube at its second end again in order to jointly form a coupling section there, which adjoins the bristle support tube in the longitudinal direction and after the hardening of the melt, is fastened to the coupling section, since the coupling section is integrally connected to the plastic cores that fill the first and second compartments.

* * * * *